United States Patent
Berkhin et al.

(10) Patent No.: US 9,495,452 B2
(45) Date of Patent: Nov. 15, 2016

(54) USER-SENSITIVE PAGERANK

(75) Inventors: Pavel Berkhin, Sunnyvale, CA (US); Usama M. Fayyad, Sunnyvale, CA (US); Prabhakar Raghavan, Saratoga, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 410 days.

(21) Appl. No.: 12/576,679

(22) Filed: Oct. 9, 2009

(65) Prior Publication Data

US 2010/0023513 A1  Jan. 28, 2010

Related U.S. Application Data

(63) Continuation of application No. 11/474,195, filed on Jun. 22, 2006, now Pat. No. 7,624,104.

(51) Int. Cl.
*G06F 17/30* (2006.01)

(52) U.S. Cl.
CPC .............. *G06F 17/30864* (2013.01)

(58) Field of Classification Search
CPC .......... G06F 17/30864; G06F 17/30616; G06F 17/30867; G06F 17/30876; G06F 17/30887
USPC ....... 707/727, 751, 723, 726, 732–734, 748, 707/999.003, 999.107
See application file for complete search history.

(56) References Cited

U.S. PATENT DOCUMENTS

| | | | |
|---|---|---|---|
| 5,878,223 A * | 3/1999 | Becker et al. | 709/223 |
| 5,920,859 A * | 7/1999 | Li | G06F 17/3061 707/711 |
| 6,278,966 B1 | 8/2001 | Howard et al. | 703/23 |
| 6,285,999 B1 | 9/2001 | Page | 707/5 |
| 6,636,848 B1 | 10/2003 | Aridor et al. | 707/3 |
| 6,792,419 B1 | 9/2004 | Raghavan | 707/3 |
| 6,981,040 B1 | 12/2005 | Konig et al. | 709/224 |
| 2002/0129014 A1 | 9/2002 | Kim et al. | 707/5 |
| 2005/0027685 A1 | 2/2005 | Kamvar et al. | 707/2 |

(Continued)

OTHER PUBLICATIONS

B. Uygar Oztekin. Usage Meets Link Analysis: Towards Improving Site Specific and Intranet Search via Usage Statistics. Ph.D. Dissertation. University of Minnesota, Minneapolis, MN. Apr. 2005.*

(Continued)

*Primary Examiner* — James E Richardson
(74) *Attorney, Agent, or Firm* — Weaver Austin Villeneuve & Sampson LLP

(57) ABSTRACT

Techniques are described for generating an authority value of a first one of a plurality of documents. A first component of the authority value is generated with reference to outbound links associated with the first document. The outbound links enable access to a first subset of the plurality of documents. A second component of the authority value is generated with reference to a second subset of the plurality of documents. Each of the second subset of documents represents a potential starting point for a user session. A third component of the authority value is generated representing a likelihood that a user session initiated by any of a population of users will end with the first document. The first, second, and third components of the authority value are combined to generate the authority value. At least one of the first, second, and third components of the authority value is computed with reference to user data relating to at least some of the outbound links and the second subset of documents.

25 Claims, 2 Drawing Sheets

(56) References Cited

U.S. PATENT DOCUMENTS

| | | | |
|---|---|---|---|
| 2005/0071328 A1* | 3/2005 | Lawrence | 707/3 |
| 2005/0071741 A1 | 3/2005 | Acharya et al. | 715/500 |
| 2005/0149502 A1 | 7/2005 | McSherry | 707/3 |
| 2006/0031195 A1* | 2/2006 | Patterson | 707/3 |
| 2006/0074871 A1* | 4/2006 | Meyerzon et al. | 707/3 |
| 2006/0074905 A1 | 4/2006 | Yun et al. | 707/5 |
| 2006/0173556 A1* | 8/2006 | Rosenberg | 700/3 |
| 2006/0200556 A1 | 9/2006 | Brave et al. | 709/224 |
| 2006/0230033 A1* | 10/2006 | Halevy et al. | 707/3 |
| 2006/0277175 A1* | 12/2006 | Jiang et al. | 707/5 |
| 2007/0061303 A1* | 3/2007 | Ramer et al. | 707/3 |
| 2007/0100795 A1 | 5/2007 | Davies | 707/3 |
| 2008/0270390 A1* | 10/2008 | Ward et al. | 707/5 |

OTHER PUBLICATIONS

Miller et al. Modifications of Kleinberg's HITS algorithm using matrix exponentiation and web log records. In Proceedings of the 24th annual international ACM SIGIR conference on Research and development in information retrieval (SIGIR '01). Sep. 2001. ACM, New York, NY, USA, pp. 444-445.*

Xing et al. "Weighted PageRank algorithm," Proceedings of the Second Annual Conference on Communication Networks and Services Research. 2004.*

Berkin, P., A Survey on "PageRank" Computing, Internet Mathematics vol. 2, No. 1., pp. 73-120, 2005.

Richardson, M. et al., The Intelligent Surfer, Probabilistic Combination of Link and Content Information in PageRank, In Advances in Neural Information Processing Systems 14, MIT Press, 2002.

Gyongyi, et al. Combating Web Spam with TrustRank, In Proceeding of $30^{th}$ VLDB Conference, Toronto, Canada, ACM Press, 2004.

Kamvar, et al., Exploiting the Block Structure of the Web for Computing PageRank, Stanford University Technical Report, 2003.

Haveliwala, T. Topic-Sensitive PageRank, In Proceedings of the Eleventh International World Wide Web Conference, 2002.

Office Action dated Sep. 4, 2008 from U.S. Appl. No. 11/474,195.

Final Office Action dated Mar. 18, 2009 from U.S. Appl. No. 11/474,195.

Notice of Allowance dated Sep. 3, 2009 from U.S. Appl. No. 11/474,195.

* cited by examiner

USER-SENSITIVE PAGERANK

RELATED APPLICATION DATA

This application is a continuation of and claims priority under section 35 U.S.C. 120 to U.S. patent application Ser. No. 11/474,195 entitled USER-SENSITIVE PAGERANK filed on Jun. 22, 2006, the entire disclosure of which is incorporated herein by reference for all purposes.

BACKGROUND OF THE INVENTION

The present invention relates to techniques for computing authority of documents on the World Wide Web and, in particular, to techniques for taking user behavior into account when computing PageRank.

PageRank is an advanced and well researched Web technology that spans over a variety of fields from data compression to linear algebra. Conventional PageRank computes authority weights of different HTML pages based on a random surfer model. In this model a steady-state distribution of the Markov chain is computed based on a transition matrix defined by a surfer that uniformly randomly follows the page out-links. To meet certain mathematical requirements (i.e., the Perron-Frobenius Theorem) a blend of such a random surfer with uniform "teleportation" is typically used. In such an approach, a surfer either follows a random out-link with probability c, or "gets bored" and starts a new session jumping to a uniformly randomly selected page with probability 1−c. Thus the term teleportation.

According to a conventional formulation, PageRank can be introduced as a vector defined over all nodes of a Web graph that satisfies the following PageRank linear system $$p = cP^T p + (1-c)v. \quad (1)$$

Here P is a Markov transition matrix in which $$P_{ij} = \begin{cases} 1/\deg(i), & \text{if there is link } i \to j \\ 0, & \text{if there is no link } i \to j \end{cases},$$

c is a teleportation coefficient usually picked around 0.85-0.9, $v = (1/n, 1/n \ldots 1/n)$ is a uniform teleportation vector, and n is a total number of all Web pages. The system can be rewritten in a more straightforward component-wise way that explicitly uses Web graph structure (deg(i) is out-degree of node i)

$$p_j = c\Sigma_{i \to j} p_i / \deg(i) + (1-c)v_j \quad (2)$$

Many iterative methods of solving PageRank equation (1) have been proposed. For an introduction to this subject see *A Survey on "PageRank" Computing*, P. Berkhin, Internet Mathematics, Vol. 2, No 1., pp. 73-120, 2005, incorporated herein by reference in its entirety for all purposes. And though the numerical properties of PageRank are relatively well studied, the usefulness of conventional formulations of PageRank in the relevancy ranking of query search results (one of its primary uses) is debatable. This is due in large part to the fact that some of the basic assumptions underlying widely used PageRank formulations are either flawed or not reflective of reality. Indeed, this fact is evidenced in the many attempts which have been made to adjust PageRank formulations to more realistic settings from the time of its introduction.

For example, the assumption that all the outgoing links in a Web page are followed by a random surfer uniformly randomly is unrealistic. In reality, links can be classified into different groups, some of which are followed rarely if at all (e.g., disclaimer links). Such "internal links" are known to be less reliable and more self-promotional than "external links" yet are often weighted equally. Attempts to assign weights to links based on IR similarity measures have been made but are not widely used. See, for example, *The Intelligent Surfer. Probabilistic Combination of Link and Content Information in PageRank*, M. Richardson and P. Domingos, Advances in Neural Information Processing Systems 14, MIT Press, 2002.

The uniform teleportation jump to all the Web pages is another example of an unrealistic assumption upon which conventional PageRank formulations are based. That is, nothing is further from reality than the assumption that users begin new sessions on major portals and obscure home pages with equal probability. Alternatively, it is sometimes assumed that teleportation is restricted to a trusted set of pages or sites. See, for example, *Combating Web Spam with TrustRank*, Z. Gyongyi, H. Garcia-Molina, J. Pedersen, In Proceedings of $30^{th}$ VLDB Conference, Toronto, Canada, ACM Press, 2004. However, this assumption is equally flawed in that it is intended to combat link spam rather than being reflective of real-world user behavior. An additional and less recognized problem is that attrition from different pages is very different and therefore cannot accurately be described by the same scalar coefficient 1−c.

Conventional PageRank formulations have another issue which relates to the manner in which they are used in practice. That is, because of the vast number of pages on the Web, PageRank computing is typically implemented with regard to aggregations of pages by site, host, or domain, also referred to as "blocked" PageRank. See, for example, *Exploiting the Block Structure of the Web for Computing PageRank*, S. Kamvar, T. Haveliwala, C. Manning, G. Golub, Stanford University Technical Report, 2003. In formulating viable blocked PageRank computations, links between pages have to be somehow aggregated to a block level. Unfortunately, most heuristics for performing this aggregation do not work well.

In view of the foregoing, new formulations of PageRank are needed which address these shortcomings.

SUMMARY OF THE INVENTION

According to a specific embodiment of the present invention, techniques are provided for generating an authority value of a first one of a plurality of documents. A first component of the authority value is generated with reference to outbound links associated with the first document. The outbound links enable access to a first subset of the plurality of documents. A second component of the authority value is generated with reference to a second subset of the plurality of documents. Each of the second subset of documents represents a potential starting point for a user session. A third component of the authority value is generated representing a likelihood that a user session initiated by any of a population of users will end with the first document. The first, second, and third components of the authority value are combined to generate the authority value. At least one of the first, second, and third components of the authority value is computed with reference to user data relating to at least some of the outbound links and the second subset of documents.

According to a more specific embodiment, generation of the first component includes assigning a weight to each of the outbound links. Each of the weights is derived with reference to a portion of the user data representing a frequency with which the corresponding outbound link was selected by a population of users.

According to another specific embodiment, generation of the second component of the authority value includes generating a teleportation distribution which includes a term for each of the second subset of documents. Each of the terms is derived with reference to a portion of the user data representing relevance of the corresponding document among a population of users.

According to some embodiments, authority value components generated with reference to user data may also be generated with reference to conventional formulations for these components such as, for example, the components represented in equation (1). Moreover, these new and conventional components may be blended together to varying degrees to generate the authority value components of the present invention.

According to yet another embodiment, an authority value of a first one of a plurality of documents is generated. Text associated with each of a plurality of inbound links enabling access to the first document is identified. A weight is assigned to the text associated with each of the inbound links. Each of the weights is derived with reference to user data representing a frequency with which the corresponding inbound link was selected by a population of users. The authority value is generated with reference to the weights.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Figure 1:
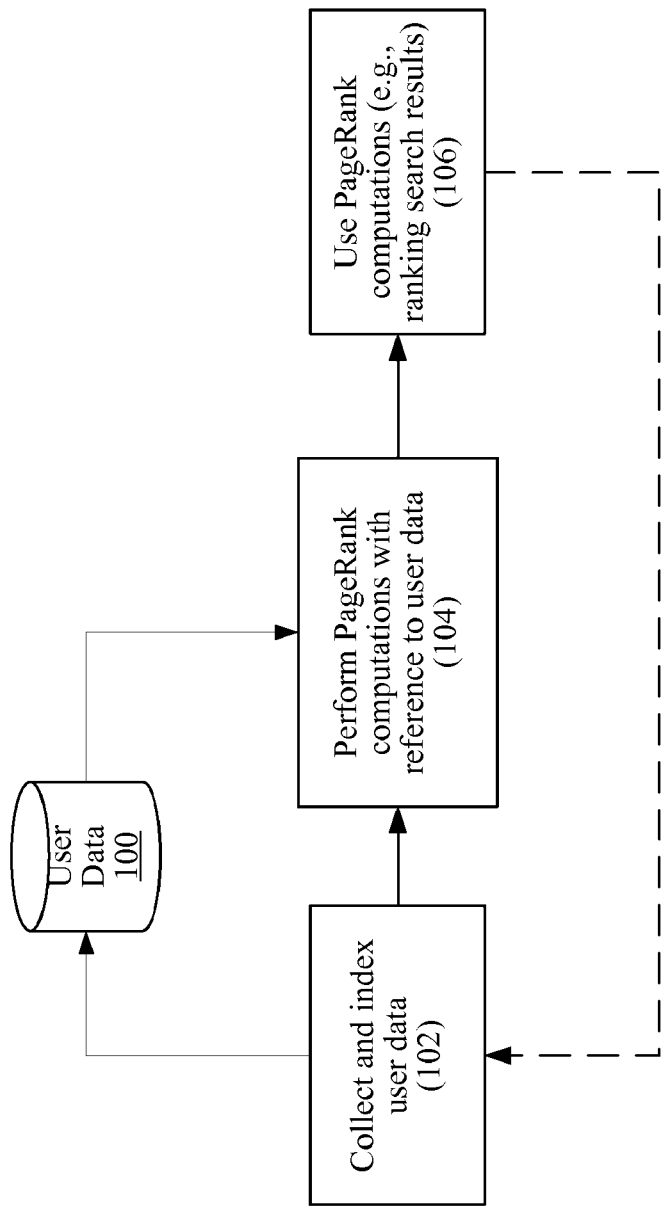
FIG. 1 is a flow diagram illustrating operation of a specific embodiment of the present invention.

The present invention provides a variety of ways to compute PageRank with reference to various types of data corresponding to actual user behavior. FIG. 1 is a flow diagram which illustrates this general idea. User data 100 which reflect the behavior and/or demographics of an underlying user population are collected and indexed (102). At least some of these data track the navigational behavior of the user population with regard to documents, pages, sites, and domains visited, and links selected. As described below, the user population, the computing context, and the techniques for collecting these data may vary considerably without departing from the scope of the present invention.

PageRank computation is performed for a plurality of pages and/or documents using a PageRank formulation constructed according to the present invention (104). As will be described, such PageRank formulations include at least one component which is derived with reference to the user data. In addition, the PageRank computation may be performed for each page/document on the Web or at some higher level of aggregation (e.g., site, host, domain, etc.). The PageRank computations may then be employed in support of a wide variety of applications (106) such as, for example, in relevancy determinations for the ranking of search results in response to user queries. And because the set of pages, the connections between them, and user behavior may change over time, the user data collection and PageRank computations may be iterated (dashed line) to ensure that they reflect the most current conditions in the computing environment.

Various embodiments of the present invention may employ PageRank formulations which incorporate or make use of user data in a variety of ways which address one or more of the issues described above. For example, as noted above the assumption of uniform endorsement along all outward-bound links associated with a page is unrealistic, e.g., internal links (e.g., disclaimer links) are typically not equal to external links. To the contrary, users "vote" by their behavior in terms of the links they actually select. Moreover, the popularity of links selected is not static, but changes over time.

Therefore, according to various embodiments, empirical data corresponding to link selection behavior by users are employed to weight outbound links in a PageRank formulation such that this user behavior is taken into account. According to a specific embodiment, the number of users who browsed from page i to page j along a link connecting the two pages is employed to assign to the link a weight which reflects a likelihood that a user will move along the directed edge corresponding to the link. Additional details regarding exemplary techniques by which this weighting may be accomplished are provided in U.S. Pat. No. 6,792,419 for System And Method For Ranking Hyperlinked Documents Based On A Stochastic Backoff Processes, the entire disclosure of which is incorporated herein by reference for all purposes.

Because most pages have very little traffic associated with them, and the traffic they do have corresponds to a low confidence estimate of user intent, according to a specific embodiment of the invention, the terms in the Markov transition matrix of equation (1) may instead be derived as follows:

$$w_{ij} = \frac{1 + \alpha n_{i \to j}}{\deg(i) + \alpha \sum_{i \to j} n_{i \to j}} \quad (3)$$

where $\alpha \geq 0$ reflects some Laplace smoothing factor, and $n_{i \to j}$ is the number of users following a particular link. It should be noted that coefficient $\alpha=0$ corresponds to a conventional formulation of this component. Notice also that higher values of $n_{i \to j}$ represent a higher impact on $w_{ij}$ in agreement with the fact that higher values imply higher confidence.

While equation (3) does incorporate some measure of the likelihood that specific links will be selected by users, more specific embodiments of the invention are contemplated which reflect further refinement of the underlying assumptions. That is, for example, users are not equal. Rather, they are part of a social network in which different weights can be assigned to different users based on a variety of factors. In addition, because the popularity of pages and links change over time, the incorporation of one or more recency factors into the PageRank formulation may be desirable. Third, the use of user data enables the creation of a targeted PageRank by aggregating user behavior over a particular user segment as defined by demographics, behavioral characteristics, user profile, etc.

According to a more specific embodiment of the invention, these refinements result in the following generalization of equation (3) in which u denote a user and S stands for a particular user segment:

$$w_{ij} = \frac{1 + \alpha \sum_{u \in S \cap u \in i \rightarrow j} f(u)}{\deg(i) + \alpha \sum_{u \in S \cap u \in i \rightarrow j} f(u)} \quad (3A)$$

Here $u \in i \rightarrow j$ means that user u followed link $i \rightarrow j$. According to one formulation, u reflects user meta-data which may include, but are not limited to, weight, recency, tenure, and time spent on a page, thus yielding:

$$w_{ij} = \frac{1 + \alpha \sum_{u \in S \cap u \in i \rightarrow j} f(u_{weight}, u_{recency}, u_{tenure}, u_{time\ spent\ on\ j})}{\deg(i) + \alpha \sum_{u \in S \cap u \in i \rightarrow j} f(u_{weight}, u_{recency}, u_{tenure})} \quad (3B)$$

Yet another specific embodiment reflects a further generalization of this idea. That is, conditioning by a user segment may assume use of a step function that is equal to one for users within S and to zero for users outside S. However, it should be noted that this idea may be generalized to any probability distribution $\rho_u$ (in practice we can assign different significance levels to different user segments), thus yielding:

$$w_{ij} = \frac{1 + \alpha \sum_{u \in i \rightarrow j} \rho_u f(u)}{\deg(i) + \alpha \sum_{u \in i \rightarrow j} \rho_u f(u)}. \quad (3C)$$

It should be noted that embodiments of the invention may work on any level of aggregation (i.e., for blocked PageRank formulations). For example, for a site or host level graph, a link between site I and site J exists if there are pages i and j connected by a hyperlink such that i∈I, j∈J. Now we can assign weights $W_{IJ}$ to the link I→J using a formula similar to any of (3)-(3C) with $N_{IJ}$ being a count of users who proceeded from any page i in site I to any page j in site J.

Because of "dangling" pages, i.e., pages having no outlinks, and because of the requirement of a graph's strong connectivity (i.e., the Markov transition matrix P has to be irreducible), a degree of teleportation is added to the PageRank formulation of equation (1) as described above. And a typical teleportation distribution $v=(v_j)$ used in a conventional PageRank formulation is selected either uniformly or uniformly among a subset of trusted pages. As noted above, both approaches have shortcomings. That is, users do not start from obscure pages with the same probability as from popular hubs (e.g., think of the effect of bookmarks), and uniform teleportation actually leads to a link-based spam. On the other hand, what can be trusted is in dispute, and a restrictive definition of trust defeats the purpose of creating a strongly-connected graph.

Therefore, according to various embodiments of the invention, user data are utilized to meaningfully estimate a teleportation distribution for a PageRank formulation. Consider different user sessions. Each session has a first or a starting page. Let $m_j$ be the count of how many times a page j was a first page in a session. Then, according to a specific embodiment, a realistic teleportation distribution v' can be defined as a blend of a more conventional distribution (e.g., v as defined above) with user-data-based component as follows:

$$v'_j = \beta v_j + (1 - \beta) \frac{m_j}{\sum_j m_j}. \quad (4)$$

where $0 \leq \beta \leq 1$ is a tuning parameter which adjusts the degree of blending of the two components. Again, it should be noted that $\beta=1$ corresponds to a conventional formulation of this component. A higher $\beta$ means a larger degree of exploration and a lesser degree of relying on behavioral data. According to one exemplary embodiment, $\beta=0.2$ is recommended as a reasonable tradeoff. It should be noted that equation (4) can be generalized in a manner similar to the generalization of equation (3) to equations (3A)-(3C) to incorporate user network utility, user tenure, recency, and time spent on a page. Even, if relatively few pages on the Web actually have a non-zero count $m_j$, the idea leads to a good teleportation distribution with a small $\beta$ accounting for a degree of exploration. The fact that only a small fraction of pages on the Web would have significant teleportation component agrees with the well known fact that a small portion of pages actually carries the bulk volume of PageRank distribution. Again, in deriving this teleportation distribution, we can take into account many other characteristics beyond frequency counts as was done for equations (3A)-(3C).

The above-described embodiments suggest simple yet powerful frameworks for addressing two of the faulty assumptions underlying conventional PageRank formulations, i.e., uniform link weighting and uniform teleportation. According to further embodiments of the invention, another shortcoming of conventional PageRank formulations, i.e., the teleportation coefficient c, is addressed. Previously, it has been assumed that given a particular page, a random surfer "becomes bored" and jumps or "teleports" to a new session (i.e., at a new page) with uniform probability (1−c). In reality, uniformly assuming this dropout rate is a very bad approximation.

Therefore, according to various embodiments of the invention, user data are utilized to estimate individual teleportation coefficients for specific pages or blocks. Let $g_i$ be a fraction of sessions that end on the page i of all sessions containing i. Then, according to a specific embodiment, a page-specific estimate of a dropout rate may be given by:

$$(1-c_i) = (1-c)\gamma + (1-\gamma)g_i \quad (5)$$

where c is a conventional teleportation coefficient, and $0 \leq \gamma \leq 1$ is a tuning parameter which enables varying degrees of blending of conventional teleportation coefficients with page-specific data. Here γ=1 corresponds to a conventional formulation with γ=0.25 being a reasonable default.

As discussed above, equations (3), (4), and (5) compute quantities related to PageRank formulations with reference to data corresponding to actual user behavior. In addition, further generalizations make it possible to account for other elements of user behavior such as, for example, user network utility, user recency, user tenure, time spent on a page, etc., e.g., equations (3A)-(3C). However, because the confidence levels for user behavior estimates relating to infrequently visited pages are low, some regularization may be desirable for specific embodiments of the invention.

It can be argued that the fraction of pages for which user data are available is small in comparison with the realm of all Web pages. Were it not so, the count of visits per page would serve as a good approximation of authority. Therefore, as described above, embodiments of the invention utilize authority propagation from conventional PageRank formulations while deriving out-link weights, teleportation vectors, and teleportation coefficients based on user behavioral data, thus blending these two types of data to varying degrees. Thus, embodiments of the invention provide more accurate PageRank authority of all pages, including pages that have little or no visitation.

Put another way, embodiments of the present invention, consolidate conventional formulations applicable to any pages with new formulations applicable to relatively few frequent, and so high authority, pages. According to some of the exemplary formulations described herein, this consolidation may be achieved to varying degrees using a kind of Laplace smoothing represented in equations (3)-(5) by parameters α, β, γ. For α=0 and β=γ=1 the formulations are reduced to the conventional formulations represented by equation (1). On the other hand, if any one of these three parameters departs from these values, some level of blending occurs and is therefore within the scope of the invention. Thus, it should be noted that embodiments of the invention are contemplated in which these tuning parameters range in value such that only one, two, or all three of the corresponding components are in play.

Further refinements and applications of the present invention will now be described.

User Segment Personalized PageRank

Many attempts have been made to define personalized PageRank formulations. For example, by selecting a narrow set of topic specific pages and restricting teleportation to these pages, a topical PageRank formulation can be constructed. According to specific embodiments of the present invention, PageRank formulations (or individual components thereof) derived in accordance with the present invention may be flexibly and straightforwardly applied to or used with any type of personalized PageRank formulation.

For example, user segmentation is commonly used in targeted advertising. A user segment can be defined in terms of a user demographic profile (e.g., age, gender, income, etc.), user location, user behavior, etc. Any or all of equations (3)-(5) above can then be specified to reflect any such user segment in that they are constructed with reference to user data corresponding to an underlying population which, in turn, can be restricted to the relevant user segment. Moreover, as discussed above, such formulations can take into account any probabilistic distribution of user relevancy such as, for example, assigning weights to different users on the basis of an age range distribution.

Blocked PageRank

As discussed above, PageRank formulations are often applied to aggregations at the host, site, or domain levels, often referred to as blocked PageRank. Blocked PageRank is useful in acceleration of PageRank computing and in PageRank personalization. To construct a blocked PageRank formulation, parameters for a factorized directed graph are defined. For example, equal weights may be assigned for any link from one block to another as between two blocks having nodes connected by a directed edge. However, such a formulation would not distinguish between a pair of blocks connected by a single spurious link, and a pair of blocks connected by multiple direct edges. A variety of schemes have been developed to derive weights for block superedges, but performance in practice has yielded mixed results.

However, because user behavior naturally aggregates at the various different "block" levels (i.e., site, host, domain, etc.), the various PageRank formulations of the present invention naturally scale up to the various block levels.

Overall PageRank Iterations

PageRank computing is related to the so-called simple power iteration method. This method depends on parameters such as edge probability distribution and teleportation described above. Equations (3)-(5) above and the generalization exemplified by equation (3A) thus lead to the following:

$$p_j^{(n+1)} = \Sigma_{i \to j} c_i w_{ij} p_i^{(n)} + (1-c_i) v_j \quad (6)$$

where transition weights $w_{ij}$ are defined by equation (3) or its analogs (e.g., equations (3A)-(3C)), teleportation distribution $v_j$ is defined by equation (4) or its analogs, and teleportation coefficients $c_i$ are defined by equation (5) or its analogs. And any derived iterative schemes that accelerate PageRank convergence and/or construct or compute blocked PageRank which employ any of the PageRank formulations or components thereof described herein are within the scope of the present invention.

Time Dynamics

In principle, PageRank should be periodically recomputed because the Web graph grows and its topology changes with time. In line with this is purely topological change, core pages with the same in and out-links still come in and out of fashion or significance over time. This is particularly important given that there is no "garbage collection" on the Web. Yet another advantage of the PageRank formulations of the present invention is that it is relatively straightforward to incorporate time dynamics. For example, a discount procedure such as, for example, exponential averaging, could readily be included into user behavior counts to emphasize recent events and discount old ones. Not only does such a modification capture temporally dependent changes in page popularity, it also operates as a de-facto Web garbage collection utility.

Other Applications

As will be understood, the various PageRank formulations of the present invention may be used in conjunction with other information to evaluate page relevance in ranking search results according to any of a wide variety of techniques. However, it should be noted that the PageRank formulations of the present invention may be used in a wide variety of other applications. An example of one such application is controlling the manner in which a web crawling application crawls the Web. That is, the PageRank formulations of the present invention may be used to support decision making by a web crawler to determine whether and on which links associated with a given page to crawl.

Moreover, the basic principles described herein can be generalized beyond PageRank formulations. Consider an anchor-text that is known as one of the most useful features used in ranking retrieved Web search results. It is usually assembled through aggregation of different \href HTML tag text strings related to incoming links. However, since incoming links have different popularity, this text can be supplied with some weights derived according to the present invention. According to the invention, knowledge of user behavior may be incorporated into such a technique as follows. Given a target page j, anchor-texts corresponding to incoming links i→d are weighted with user behavior scores $w_{ij}$ computed as described above. As will be understood, various formulas may be used in relevancy ranking to aggregate hyperlink anchor text. Any of those formulas may be modified in accordance with the present invention to reflect link weights corresponding to user behavior in a manner similar to equations (3)-(3C).

Figure 2:
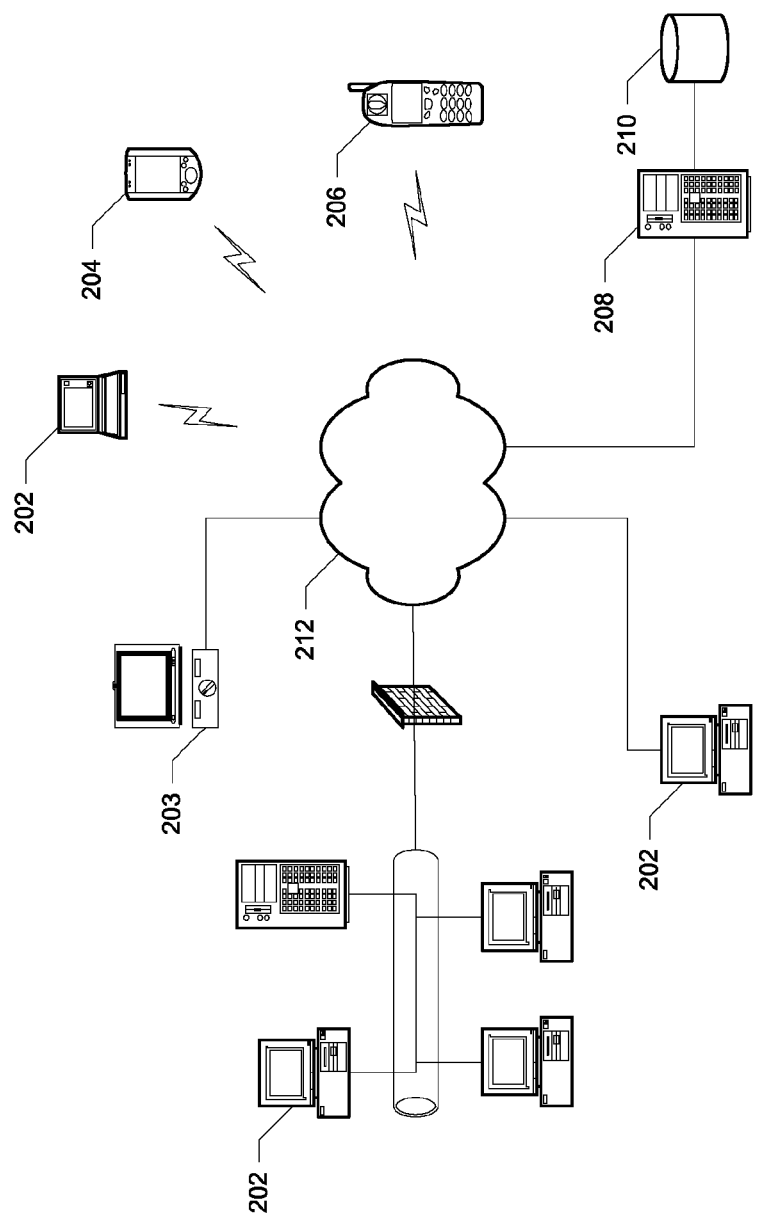
FIG. 2 is a simplified diagram of a network environment in which specific embodiments of the present invention may be implemented.

Embodiments of the present invention may be employed to compute PageRank or similar formulations in any of a wide variety of computing contexts. For example, as illustrated in FIG. 2, implementations are contemplated in which the relevant population of users interact with a diverse network environment via any type of computer (e.g., desktop, laptop, tablet, etc.) 202, media computing platforms 203 (e.g., cable and satellite set top boxes and digital video recorders), handheld computing devices (e.g., PDAs) 204, cell phones 206, or any other type of computing or communication platform.

And according to various embodiments, user data processed in accordance with the invention may be collected using a wide variety of techniques. For example, collection of data representing a user's interaction with specific Web pages may be accomplished using any of a variety of well known mechanisms for recording a user's online behavior. However, it should be understood that such methods of data collection are merely exemplary and that user data may be collected in many other ways. For example, user data may be collected when a user registers with, for example, a particular web site or service.

Once collected, the user data are processed and stored in some centralized manner. This is represented in FIG. 2 by server 208 and data store 210 which, as will be understood, may correspond to multiple distributed devices and data stores. The invention may also be practiced in a wide variety of network environments (represented by network 212) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method, comprising:
identifying text associated with each of a plurality of inbound links enabling access to a first document of a plurality of documents, wherein each of the plurality of inbound links is a link from another document to the first document, wherein the text is anchor text;
assigning a text weight to the text associated with each of the plurality of inbound links, each of the text weights being derived with reference to user data, a first portion of the user data representing a frequency with which the corresponding inbound link was selected by a population of a plurality of users, the population of the plurality of users having a set of user characteristics, and a second portion of the user data including user weights assigned to users in the population of users, the user weights being based, at least in part, upon an age range distribution, the user characteristics including one or more demographics, the one or more demographics including age;
generating an authority value of the first document based, at least in part, upon the text weights assigned to the text associated with each of the plurality of inbound links;
receiving a search query; and
ranking the first document among a plurality of search results with reference to the authority value.

2. The method of claim 1 wherein the plurality of documents are represented by a graph, and the text weight associated with each of the inbound links represents a likelihood that a user will traverse a directed edge of the graph associated with the corresponding inbound link.

3. The method of claim 1 wherein the population of users corresponds to a particular segment of a superset of users, the segment being selected from the superset of users with reference to one or more of demographic data or behavior data.

4. The method of claim 1 wherein each of the weights is further derived with reference to a probabilistic distribution associated with the population of users.

5. The method of claim 1 wherein the first document comprises any of a page, a file, a site, a host, a domain.

6. The method of claim 1, wherein the authority value represents a likelihood that a user session initiated by a user will include accessing the first document.

7. The method of claim 1, wherein the authority value represents a likelihood that a user session initiated by any of the population of users will include accessing the first document.

8. The method of claim 1, wherein each of the text weights indicates a likelihood that a user will browse from another page to the first document.

9. The method of claim 1, wherein each of the text weights indicates a likelihood that any of the population of users will browse from another page to the first document.

10. The method of claim 1, wherein the plurality of inbound links are not search results.

11. The method of claim 1, wherein the user characteristics comprise the demographics.

12. The method of claim 1, wherein the demographics comprise age such that different user weights are assigned to different users based upon their age.

13. The method of claim 1, wherein ranking is further performed based, at least in part, on the anchor text associated with each of the plurality of inbound links.

14. The method of claim 1, wherein the plurality of search results are identified in response to receiving a search query received from a user in the population of users.

15. The method of claim 1, wherein the one or more demographics further comprise gender.

16. A system, comprising:
one or more computing devices comprising
at least one processor, and
at least one memory,
wherein the at least one processor or the at least one memory is configured to:
identify text associated with each of a plurality of inbound links enabling access to a first document of a plurality of documents, wherein each of the plurality of inbound links is a link from another document to the first document, wherein the text is anchor text;
assign a text weight to the text associated with each of the plurality of inbound links, each of the text weights being derived with reference to user data, a first portion of the user data representing a frequency with which the corresponding inbound link was selected by a population of a plurality of users, the population of the plurality of users having a set of user characteristics, and a second portion including user weights assigned to users in the population of users, the user weights being based, at least in part, upon an age range distribution the user characteristics including one or more demographics, the one or more demographics including age; and
generate an authority value of the first document based, at least in part, upon the text weights assigned to the text associated with each of the plurality of inbound links;
receive a search query; and
rank the first document among a plurality of search results with reference to the authority value.

17. The system of claim 16 wherein the plurality of documents is represented by a graph, and the text weight associated with each of the inbound links represents a likelihood that a user will traverse a directed edge of the graph associated with the corresponding inbound link.

18. The system of claim 16 wherein the population of users corresponds to a particular segment of a superset of users, the segment being selected from the superset of users with reference to one or more of demographic data or behavior data.

19. The system of claim 16 wherein each of the text weights is further derived with reference to a probabilistic distribution associated with the population of users.

20. The system of claim 16 wherein the first document comprises any of a page, a file, a site, a host, a domain.

21. A computer program product comprising at least one non-transitory computer-readable storage medium having computer instructions stored therein that are configured to cause one or more computing devices to:
identify text associated with each of a plurality of inbound links enabling access to a first document of a plurality of documents, wherein each of the plurality of inbound links is a link from another document to the first document, wherein the text is anchor text;
assign a text weight to the text associated with each of the plurality of inbound links, each of the text weights being derived with reference to user data, a first portion of the user data representing a frequency with which the corresponding inbound link was selected by a population of a plurality of users, the population of the plurality of users having a set of user characteristics, and a second portion of the user data including user weights assigned to users in the population of users, the user weights being based, at least in part, upon an age range distribution, the user characteristics including one or more demographics, the one or more demographics including age;
generate an authority value of the first document based, at least in part, upon the text weights assigned to the text associated with each of the plurality of inbound links;
receive a search query; and
rank the first document among a plurality of search results with reference to the authority value.

22. The computer program product of claim 21 wherein the plurality of documents is represented by a graph, and the text weight associated with each of the inbound links represents a likelihood that a user will traverse a directed edge of the graph associated with the corresponding inbound link.

23. The computer program product of claim 21 wherein the population of users corresponds to a particular segment of a superset of users, the segment being selected from the superset of users with reference to one or more of demographic data or behavior data.

24. The computer program product of claim 21 wherein each of the text weights is further derived with reference to a probabilistic distribution associated with the population of users.

25. The computer program product of claim 21 wherein the first document comprises any of a page, a file, a site, a host, a domain.

* * * * *